(12) United States Patent
Koch et al.

(10) Patent No.: US 6,804,716 B1
(45) Date of Patent: Oct. 12, 2004

(54) NETWORK AND METHOD FOR CALL MANAGEMENT

(75) Inventors: Robert A. Koch, Norcross, GA (US); Mustafa Sinasi Bilsel, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/470,375

(22) Filed: Dec. 22, 1999

(51) Int. Cl.[7] .............................................. G06F 15/173
(52) U.S. Cl. ..................... 709/225; 709/223; 709/224; 709/229
(58) Field of Search ................................ 709/203, 204, 709/217, 219, 216, 223, 224, 225, 229

(56) References Cited

U.S. PATENT DOCUMENTS

| | | | | |
|---|---|---|---|---|
| 5,438,568 A | * | 8/1995 | Weisser, Jr. ................ | 370/389 |
| 5,696,809 A | * | 12/1997 | Voit ........................ | 379/22.01 |
| 5,696,901 A | * | 12/1997 | Konrad ..................... | 709/203 |
| 5,706,437 A | * | 1/1998 | Kirchner et al. ............ | 709/203 |
| 5,915,008 A | * | 6/1999 | Dulman ................... | 379/221.08 |
| 5,958,016 A | * | 9/1999 | Chang et al. .............. | 709/229 |
| 6,031,904 A | * | 2/2000 | An et al. ................ | 379/201.02 |
| 6,091,808 A | * | 7/2000 | Wood et al. ........... | 379/201.04 |
| 6,205,135 B1 | * | 3/2001 | Chinni et al. ............... | 370/356 |
| 6,233,318 B1 | * | 5/2001 | Picard et al. ............ | 379/88.17 |
| 6,240,174 B1 | * | 5/2001 | Silver ........................ | 379/230 |
| 6,266,690 B1 | * | 7/2001 | Shankarappa et al. ...... | 709/202 |
| 6,424,945 B1 | * | 7/2002 | Sorsa ..................... | 704/270.1 |

* cited by examiner

Primary Examiner—Saleh Najjar
(74) Attorney, Agent, or Firm—Kirkpatrick & Lockhart LLP

(57) ABSTRACT

A communications network for accessing a call management profile. The network includes a database storing the call management profile, a server in communication with the database for generating an interface document including the call management profile, and an AIN in communication with the server.

23 Claims, 3 Drawing Sheets

NETWORK AND METHOD FOR CALL MANAGEMENT

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to communications and, more particularly, to networks and methods for accessing call management profiles.

2. Description of the Background

Competition among telephone service providers in conjunction with recent technological advancements has resulted in a plethora of enhanced calling features and services available to telecommunications customers. Consequently, the typical telecommunications customer may become easily confused when trying to differentiate the various features and services. This potential confusion is exacerbated by the fact that the knowledge regarding the particular services and features to which the customer subscribes, i.e., the subscriber's call management profile, resides with the telecommunications network and not the telephone device itself. Accordingly, the customer is unable to easily and efficiently access his call management profile to review and/or modify its settings. Rather, the customer is typically required to configure his profile through the involved process of the telephone service provider. Such a process is typically inefficient and confusing for the customer because of the inability to visualize and interact with the call management profile. While these drawbacks apply to individuals trying to manage their personal call management profiles, they are especially acute for persons responsible for coordinating a large number of lines, such as a telecommunications manager for a large entity, such as a business or institution.

Accordingly, there exists a need for a manner in which persons may easily and efficiently access their call management profiles such that they may, for example, view or modify the parameters of the profile. Moreover, there exists a need for a relatively user-friendly manner in which to allow a customer to interface with their call management profiles.

BRIEF SUMMARY OF INVENTION

The present invention implements a practical manner in which people may access their call management profiles to, for example, configure their incoming and outgoing enhanced calling features and services as desired. Accordingly, in contrast to prior systems, the present invention provides an efficient and user-friendly manner by which telecommunications customers may configure their call management profiles. Call management may be provided, for example, via a PC browser interface or a telephone interface.

A subscriber's call management profile is stored in a database in communication with a server. The server may be in communication with a Service Switching Point (SSP) switch, a Service Control Point (SCP), and an Intelligent Resource Server (IRS) of an Advanced Intelligent Network (AIN) of a telephone system. The server may be in communication with the AIN of the telephone system via a network and TCP/IP communications links. The subscriber may access the call management profile stored in the database using, for example, either a telephone or a personal computer (PC).

For example, for the PC browser interface, the PC may be in communication with the server via the SSP switch and an Internet Service Provider (ISP). The server may generate an interface document displaying the subscriber's call management profile in a format suitable for interaction with the PC using, for example, browsing software of the PC. The subscriber may interact with the document using the browser interface, such that data may be written to the profile to configure the profile as desired.

For a telephone interface, the subscriber may call a certain telephone number, which call is routed to the IRS by the SCP according to AIN call processing functionality. The server generates an audio-based interface document of the call management profile, and the IRS mediates the interaction between the caller and the server. The IRS may translate the audio-based interface document to a voice format using Text-to-Speech (TTS) translation capabilities, allowing the interface document to be voiced back to the subscriber over the telephone. One example of such an audio-based interface format is VoiceXML (Voice eXtensible Markup Language), a web interface language having tags, formats, and structures specific to voice applications. In addition, the IRS may include Automatic Speech Recogrntion (ASR) and DTMF decoding capabilities such that the subscriber may interact with the interface document by speaking certain keywords or dialing certain digits and characters which are recognized by the IRS as commands to execute certain tasks relative to the document.

To provide the enhanced calling features and services outlined in the subscriber's call management profile, the SCP may retrieve the subscriber's call management profile from the database via the server and the TCP/IP communications links, and use the data in the profile in the course of executing the call processing logic for the call to determine what features or services to apply to the call.

These and other benefits of the present invention are apparent from the detailed description of the invention hereinbelow.

DESCRIPTION OF THE FIGURES

For the present invention to be clearly understood and readily practiced, the present invention will be described in conjunction with the following figures wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a communication network. For example, certain operating system details and modules of certain of the intelligent platforms of the network are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
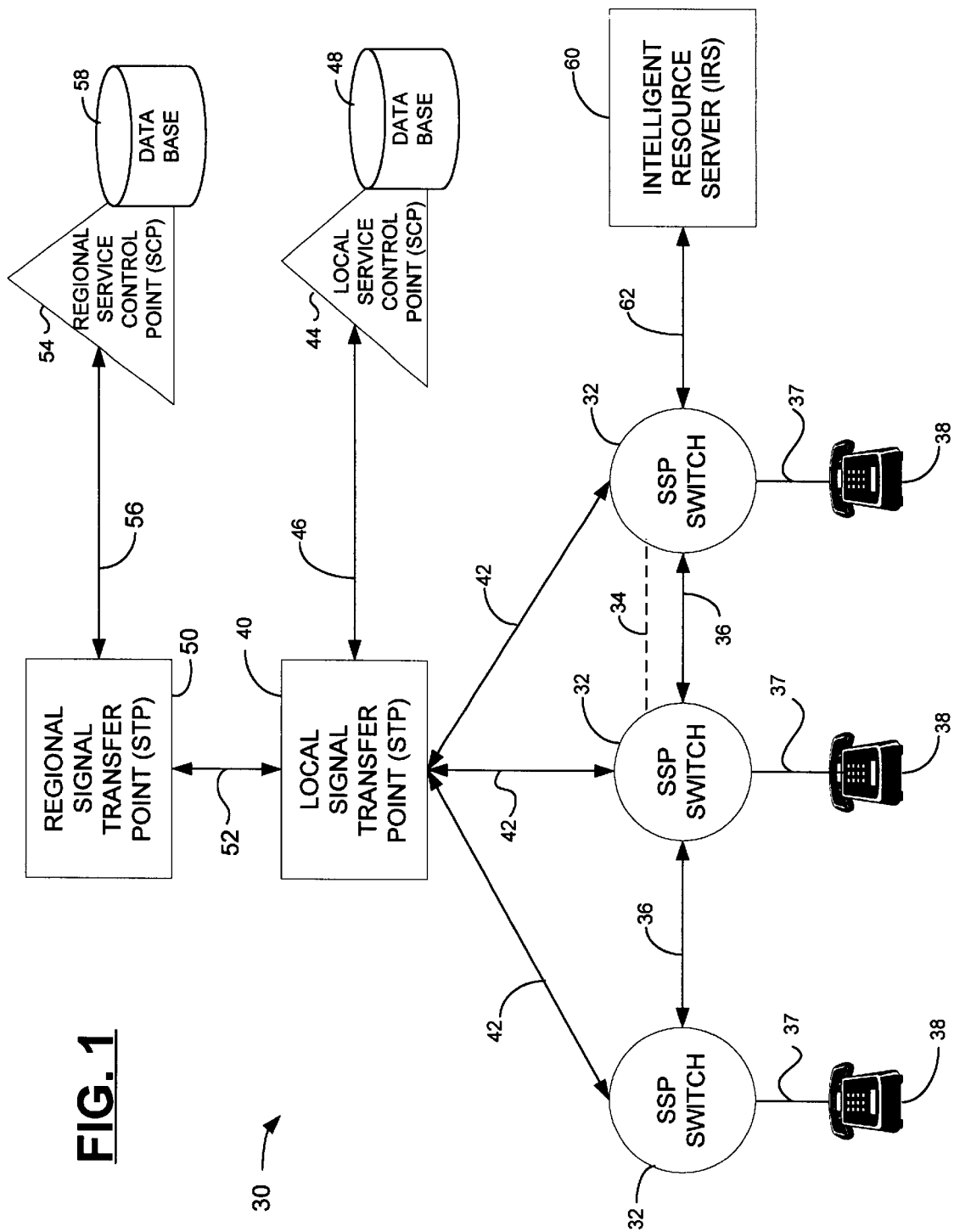
FIG. 1 is a block diagram of an Advanced Intelligent Network (AIN) for integration with a public switched telephone network (PSTN)

FIG. 1 is a block diagram of an Advanced Intelligent Network (AIN) 30 which may be integrated with a public switched telephone network (PSTN). AINs are typically utilized by Local Exchange Carriers (LECs) to allow the LECs to provide call processing features and services that are not embedded within conventional switching circuits of the PSTN. For an LEC having the AIN 30 illustrated in FIG. 1, the central office (CO) switches of the LEC may be provided as Service Switching Points (SSP) switches 32. The dashed line 34 between the SSP switches 32 indicates that the number of SSP switches 32 for a particular LEC may vary depending on the requirements of the AIN 30 for the LEC. Interconnecting the SSP switches 32 are data links 36, which may be, for example, trunk circuits.

Each SSP switch 32 has a number of subscriber lines 37 connected thereto. The subscriber lines 37 may be, for example, conventional twisted pair loop circuits connected between the telephone drop for the customer premises and the SSP switches 32 or trunk circuits, such as T–1 trunk circuits, interconnecting the customer premises and SSP switches 32. Typically, the number of subscriber lines 37 connected to SSP switch 32 is on the order of ten thousand to one hundred thousand lines. Each of the subscriber lines 37 is connected to a terminating piece of customer premises equipment, represented in FIG. 1 by telephones 38. Alternatively, the terminating piece of customer premises equipment may be, for example, a telecopier, a personal computer (PC), a modem, or a private branch exchange (PBX) switching system.

According to the AIN 30 illustrated in FIG. 1, each SSP switch 32 is connected to a local signal transfer point (STP) 40 via data links 42. The data links 42 may employ, for example, an SS7 switching protocol. The local STP 40 may be a multi-port high speed packet switch that is programmed to respond to the routing information in the appropriate layer of the switching protocol, and route the data packets to their intended destination.

One of the intended destinations of the data packets from the local STP 40 is a local service control point (SCP) 44. The local STP 40 is in communication with the local SCP 44 via a data link 46, which may also employ the SS7 switching protocol. The local SCP 44 may be an intelligent database server, such as an Intelligent Network Service Control Point available from Lucent Technologies Inc., Murray Hill, N.J., and having associated with it a network database 48 for storing network data. The intelligent functionality of the local SCP 44 may be realized by programs, such as a Service Program Applications (SPA), which are run by the local SCP 44. The local SCP 44 is normally employed to implement high volume routing services, such as call forwarding and 800 number translation and routing. The local SCP 44 may also be used for maintenance of and providing access to the network databases for authorization of billing, such as credit card validations. In addition, another of the functions of the local SCP 44 is to implement a particular subscriber's enhanced call features or services. The local SCP 44 may perform this function in conjunction with the associated network database 48, which may store subscriber information, such as subscriber call management profiles, used in providing the enhanced calling features and services. Such enhanced calling services may include call forwarding, call screening and blocking for both incoming and outgoing calls, and remote event notification.

Another of the intended destinations of the data packets from the local STP 40 may be a regional STP 50. The regional STP 50 may be in communication with the local STP 40 through a data link 52, which may, for example, employ the SS7 switching protocol. The regional STP 50 is in communication with a regional SCP 54 via a data link 56, which may be physically and functionally the same as the data link 46. Associated with the regional SCP 54 may be a network database 58 for storing network data. The regional STP 50 and the regional SCP 54 may be used for routing and servicing calls among different LECs.

The AIN 30 illustrated in FIG. 1 also includes an intelligent resource server (IRS) 60. The IRS 60 may be, for example, a service node such as a Compact Service Node (CSN) available from Lucent Technologies Inc., Murray Hill, N.J., although the IRS 60 may be any other AIN-compliant IRS such as, for example, an AIN/IP (Intelligent Peripheral) IRS from Nortel Networks Corp., Montreal, Quebec. The IRS 60 may be similar to the local SCP 44, and may additionally include voice and DTMF signal recognition devices and voice synthesis devices. The IRS 60 may be used primarily when some enhanced feature or service is needed that requires an audio connection to the call such as, for example, call return, or when transfer of a significant amount of data to a subscriber over a switched connection during or following a call. The IRS 60 may be connected to one or more of the SSP switches 32 via a data link 62, which may be, for example, an Integrated Service Digital Network (ISDN) or a T–1 switching trunk circuit.

In order to keep the processing of data and calls as simple as possible at the switches, such as at the SSP switches 32, a set of triggers are defined at the SSP switches 32 for each call. A trigger in the AIN is an event associated with a particular subscriber line 37 that generates a data packet to be sent from the SSP switch 32 for the particular subscriber line 37 to, for example, the local SCP 44 via the local STP 40. The triggers may be an originating trigger for calls originating from the subscriber premises or terminating triggers for calls terminating at the subscriber premises. The trigger causes a message in the form of a query to be sent, for example, from the SSP switch 32 to the local SCP 44. The local SCP 44 in turn may interrogate the database 48 to determine whether some customized call feature or enhanced service should be implemented for the particular call based on the subscriber's call management profile, stored in the database 48, or whether conventional dial-up telephone service should be provided. The results of the database inquiry are sent back from the local SCP 44 to the SSP switch 32 via the local STP 40. The return packet includes instructions to the SSP switch 32 as to how to process the call. The instructions may be to take some special action as a result of a customized calling service or enhanced feature. For example, for a calling feature requiring the IRS 60 capabilities, the return instructions to the SSP switch 32 from the local SCP 44 may be to route the call to the IRS 60. In addition, the return instructions from the local SCP 44 may simply be an indication that there is no entry in the database 48 that indicates anything other than conventional telephone service should be provided for the call. The query and return messages may be formatted, for example, according to conventional SS7 TCAP (Transaction Capabilities Application Part) formats.

The AIN 30 illustrated in FIG. 1 may further include other network elements which are not included in FIG. 1 for purposes of clarity. For example, the local and regional STPs 40, 50 and the local and regional SCPs 44, 54 may be provided in mated redundant pairs for enhancing network reliability. In addition, the AIN 30 may include additional IRSs 60. Also, the AIN 30 may include one or more 1AESS Network Access Points (NAPs) in communication with the local STP 40, which may be programmed to detect the trigger conditions.

Figure 2:
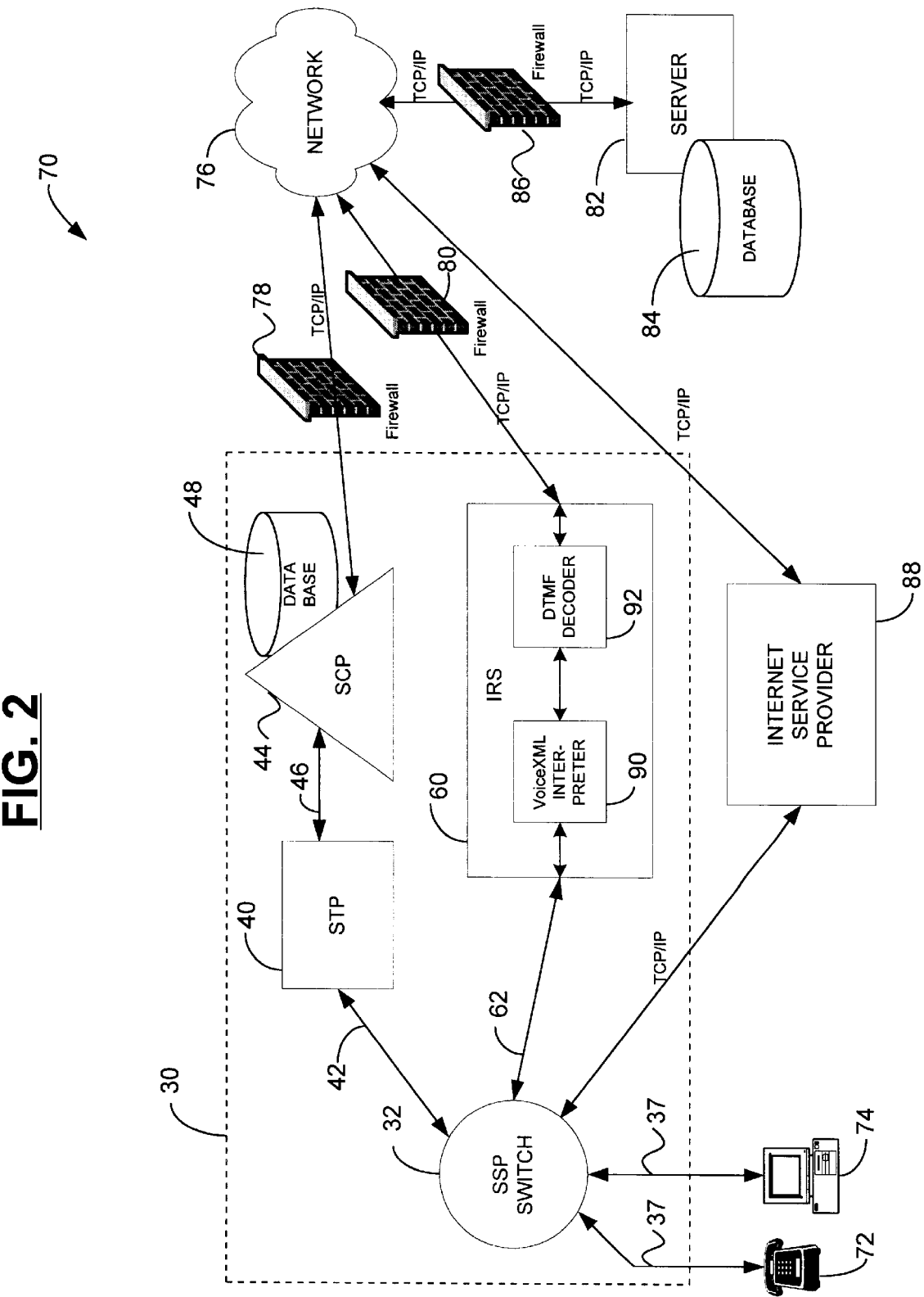
FIG. 2 is a block diagram of a communications network including the AIN of FIG. 1 according to one embodiment of the present invention.

FIG. 2 is a block diagram of a network 70 according to one embodiment of the present invention for providing a telecommunications subscriber access to their call management profile. The network 70 includes portions of the AIN 30 illustrated in Figure 1, including the SSP switch 32, the local STP 40, the local SCP 44, and the IRS 60. For clarity, in FIG. 2 only one SSP switch 32 is shown, and the regional STP 50 and regional SCP 54 have been removed, although it should be noted that the AIN 30 of the network 70 may include these and other components as discussed hereinbefore. The customer premises terminating equipment are illustrated in FIG. 2 as a telephone 72 and a personal computer (PC) 74, which are connected to the SSP switch 32 of the AIN 30 via subscriber lines 37. The customer premises terminating equipment may also be, for example, a telecopier, a modem, or a PBX.

According to one embodiment of the present invention, the AIN 30 is in communication with a network 76. The network 76 may be, for example, the Internet or an intranet. The network 76 may be in communication with the SCP 44 and the IRS 60 of the AIN 30 via, for example, TCP/IP communications links. For security purposes, firewalls 78, 80 may be provided between the network 76 and the AIN 30.

According to one embodiment of the present invention, the subscriber's call management profile is hosted by an active server 82 and an associated database 84. The server 82 may be, for example, a Windows NT® server (Windows NT® is a registered trademark of Microsoft Corp., Redmond, Wash.), and is in communication with the network 76 via, for example, TCP/IP commnunications links. Again for security purposes, a firewall 86 may be provided between the server 82 and the network 76.

According to one embodiment, the database 84 maintains the subscriber's call management profile. The subscriber's call management profile may include calling services such as, for example, call forwarding, call screening, call blocking, and remote event notification. The database 84 may contain only the data for the subscriber's call management profile, thus lacking any call processing logic. Such call processing logic, for example, may reside instead with the SCP 44. The subscriber may access his call management profile via the network 76 and the server 82. The server 82 may generate an interface document of the subscriber's call management profile in real-time each time access to the profile is sought. The server 82 may generate the interface document according to different formats depending on the mode of access.

For example, the PC 74 may be in communication with the network 76 via, for example, TCP/IP communications links between the network 76 and the SSP switch 32. Routing of the data packets sent along the TCP/IP communications links between the SSP switch 32 and the network 76 may be facilitated by an Internet Service Provider (ISP) 88. If the subscriber seeks to access the call management profile stored in the database 84 using the PC 74 (or any similar device in communication with the SSP switch 32 and using PC-type browsing software), the server 82 may generate the interface document containing the subscriber's call management profile in a format suitable for PC-type browsing software, such as according to HTML or XML formats. The interface document may contain a visual outline of the subscriber's profile, and provide the subscriber with the opportunity to modify the profile by writing data to the profile using the browsing software. For example, the subscriber may activate or deactivate certain calling features, such as call forwarding or call blocking, or could supply a new call forwarding number. Moreover, the document may be formatted such that it is user-friendly, i.e., visually formatted to perspicuously detail the subscriber's profile.

According to another embodiment of the present invention, the subscriber may access his call management profile using the telephone 72 connected to the SSP switch 32 according to the AIN call processing capabilities of the network 70. To access the profile using the telephone 72 (i.e., a telephone interface), the subscriber may dial a certain administration telephone number. This number may cause the SSP switch 32 to send a TCAP message to the SCP 44 in response to an originating trigger. The SCP 44 may recognize the number as the number to access a call management profile, and return a TCAP message to the SSP switch 32 to route the call with an instructional message to the IRS 60. The instructional message may include the phone number of the party placing the call (i.e., the number for the subscriber line 37).

The IRS 60 may map the call to an audio-based interface document generated by the server 82 which includes the subscriber's call management profile. For example, the IRS 60 may map the incoming call and its associated phone number to a URL address having an IP address of the server 82. For example, if the user's telephone number is 412-555-8670, the IRS 60 may map the call to the URL <<205.150.50.1/profile/4125558670>>, where "205.150.50.1" is the IP address of the server 82, "profile" signifies an application to execute, and "4125558670" specifies the subscriber.

To permit the subscriber to access the audio-based interface document generated by the server 82, the IRS 60 may include an audio-based interface interpreter 90 having text-to-speech (TTS) translation and Automatic Speech Recognition (ASR) capabilities. The TTS and ASR capabilities of the interpreter 90 may be realized by software, such as TTS and ASR software available from Lucent Technologies, Inc., Murray Hill, N.J., executable by the IRS 60 to mediate the interaction between the subscriber and the interface document generated by the server 82.

The interpreter 90 may convert the interface document to a voice format, such that the parameters of the subscriber's call management profile may be voiced back over the telephone 72 to the subscriber using the TTS capabilities of the interpreter 90. An example of such an audio-based interface format is VoiceXML (Voice eXtensible Markup Language), a web interface language having tags, formats, and structures specific to voice applications. For an embodiment in which the server 82 generates VoiceXML documents, the IRS 60 includes a corresponding VoiceXML interpreter 90. The present invention will be described herein as employing VoiceXML capabilities, although other embodiments of the present invention may employ other audio-based interface formats.

The IRS 60 mediates the interaction between the subscriber and the server 82, retrieving the required VoiceXML documents from the server 82 according to the responses of the subscriber. The ASR functionality of the interpreter 90 permits the interpreter 90 to recognize certain keywords spoken by a user of the telephone 72 as commands to perform certain tasks. For example, the interpreter 90 may be programmed to recognize certain keywords based on the VoiceXML content presented by the server 82 as commands to activate or deactivate certain features, or to otherwise modify the profile. In addition, other keywords may be recognized by the interpreter 90 as commands to browse the VoiceXML document.

In addition, to facilitate interfacing with the VoiceXML document, the IRS 60 may also include a DTMF decoder 92. The DTMF decoder 92 may be programmed to recognize the dialing of certain digits or characters of, for example, a touch-tone telephone, as commands to modify or browse the profile contained in the interface document. For example, the # and * characters of a touch-tone telephone may be used to activate or deactivate certain enhanced calling features. In addition, when the subscriber desires to place a call while the call management profile is being voiced to the subscriber, the subscriber may simply begin dialing the destination number. The DTMF decoder 92 may be programmed to recognize a string of digits starting with a prefix other than, for example, the # or * characters, as the subscriber's request to place a conventional call. The SSP switch 32 may then provide normal call processing to complete the call, and the IRS 90 and server 82 may be taken out of the loop.

Accordingly, the communication network 70 of the present invention permits a subscriber to effectively write data to their call management profile, using either, for example, voice commands or dialing commands, to configure their profile as desired. For example, using either voice commands or by dialing certain digits and characters, the subscriber may activate or deactivate certain calling features, such as call forwarding and call blocking, or may supply a different telephone number for call forwarding purposes.

For an example of how the network 70 may process calls with a subscriber's call management profile stored in the database 84, suppose a party places a call to a subscriber who has configured his call management profile according to the present invention. The incoming call to the SSP switch 32 activates a terminating trigger, causing the SSP switch 32 to send, for example, a TCAP query message to the SCP 44 (via the STP 40). In addition to executing generic terminating call processing logic, the SCP 44 recognizes that it requires a profile for the subscriber to determine what features or service to apply to the call. This recognition may come from an interrogation of the network database 48 by the SCP 44.

Requiring the profile, the SCP 44 may query the server 82 via the network 76 and the TCP/IP communications links to retrieve the profile for the subscriber stored in the database 84 based on the number of the called party (i.e., the subscriber). The subscriber's inbound call management profile may be returned from the server 82 to the SCP 44 such that the SCP 44 can use the data in the profile in the course of executing the call processing logic for the call to determine what features or services to apply to the incoming call. A TCP/IP query/response message set may be employed to allow the SCP 44 to query the server 82 via the network 76 and TCP/IP communications link and to allow the server 82 to return the call management profile to the SCP 44.

The operation for an outgoing call would be similar to that described hereinbefore for an incoming call, except that the SSP switch 32 would query the SCP 44 based on an originating trigger rather than a terminating trigger, and that the SCP 44 would retrieve the subscriber's outgoing call management profile from the server 82, rather than the incoming profile.

Figure 3:
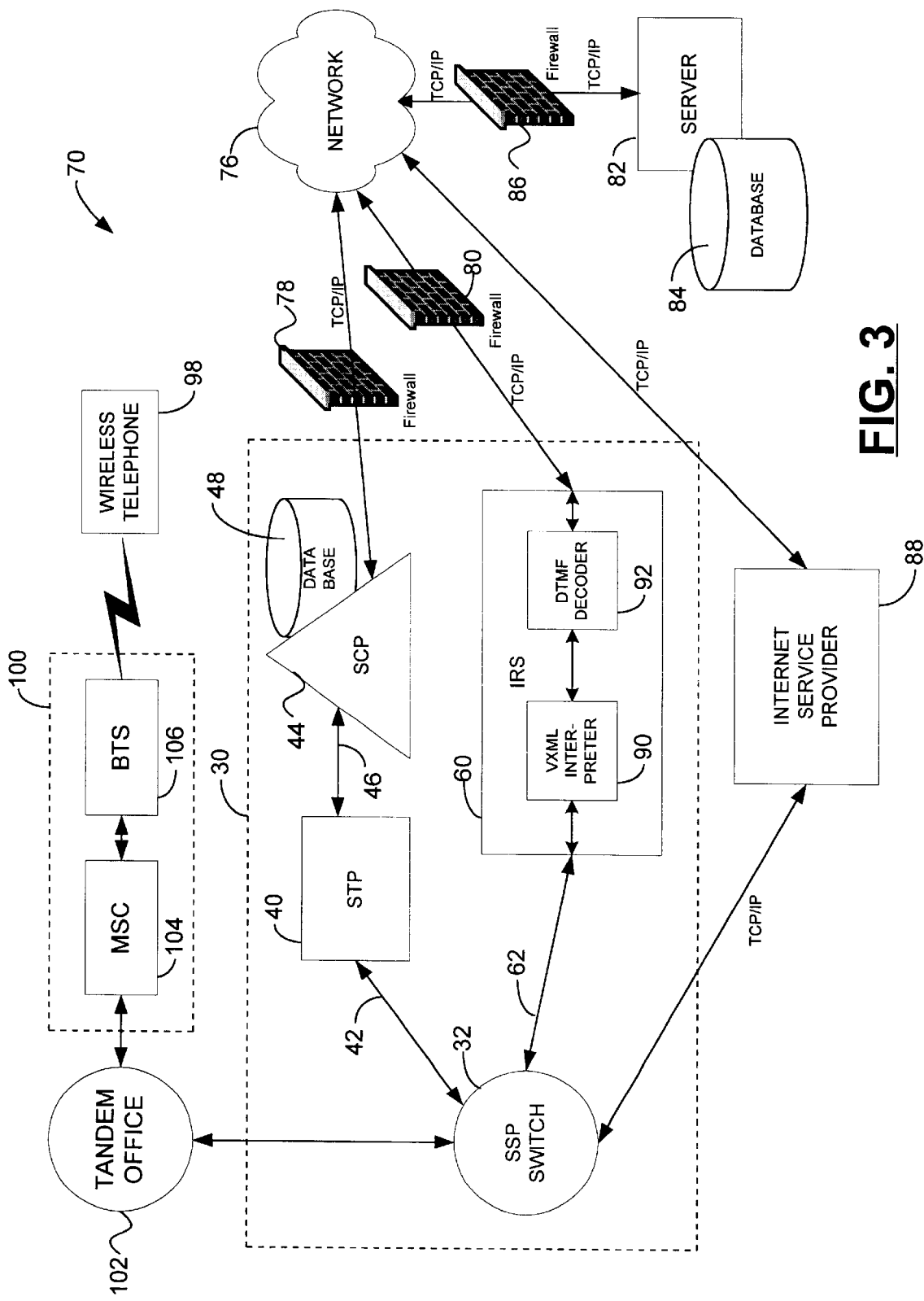
FIG. 3 is a block diagram of the communications network according to another embodiment of the present invention.

The communications network 70 of the present invention also permits a wireless device subscriber to access and/or modify their call management profiles, as described with reference to FIG. 3. The communications network 70 illustrated in FIG. 3 is similar to that illustrated in FIG. 2, except that it includes a wireless telephone 98 in communication with the SSP switch 32 of the AIN 30. In addition, some of the elements of the network 70 of FIG. 2 have been removed for purposes of clarity, such as the telephone 72 and PC 74.

The wireless telephone 98 may be in communication with the SSP switch 32 via a wireless network 100 and a tandem office 102. The wireless network 100 may include, for example, a Mobile Switching Center (MSC) 104 and a base transceiver station (BTS) 106. The wireless telephone 98 may communicate with the BTS 106 via a radio communications link according to an air-interface communications scheme such as, for example, CDMA, TDMA, or SM. The BTS 106 may communicate with the MSC 104 by, for example, an SS7 switching trunk network or an ISDN. The MSC 104 may be in communication with the SSP switch 32 of the AIN 30 via the tandem office 102.

A user of the wireless telephone 98 may access the call management profile stored in the database 84 in a manner similar to that as described hereinbefore with respect to the telephone 72 of FIG. 2. A user of the wireless telephone 98 may access the server 82 via the AIN 30 by dialing a certain administration telephone number as described hereinbefore with respect to the telephone 72 of FIG. 2.

In addition, the processing of conventional dial-up telephone service for the wireless telephone 98 where the subscriber's call management profile is stored in the database 84 may be similar to that as described hereinbefore with respect to the telephone 72. That is, for calls to or from the wireless telephone 98, the SCP 44 may retrieve the appropriate portion of the subscriber's profile stored in the database 84 to execute the call processing logic for the call.

Although the present invention has been described hereinbefore with regard to certain embodiments, those of ordinary skill in the art will recognize that many modifications and variations of the present invention may be implemented. The foregoing description and the following claims are intended to cover all such modifications and variations.

What is claimed is:

1. A communications network for accessing a call management profile by a user, comprising:

a database for storing the call management profile;

a server in communication with the database for generating in real-time an interface document including the call management profile when the user issues a database access request to the server; and an AIN structure comprising an element, the AIN structure in communication with the server and for routing the database access request issued by the user to the server;

wherein the database, the server, and the interface document including the call management profile are located outside of the AIN structure;

wherein the server is further for generating the interface document in a text-based format when the user's access mode is a browser and in an audio-based format when the user's access mode is a telephone interface, wherein the call management profile may be updated by the user directly in the interface document; and wherein the server is further for providing data contained in the call management profile to the AIN element in response to a query therefrom.

2. The communications network of claim 1, wherein the text-based format includes a HTML document including the call management profile.

3. The communications network of the claim 1, wherein the audio-based format is a VoiceXML document including the call management profile.

4. The network of claim 1, wherein the AIN includes:

a SSP switch; and a SCP in communication with the SSP switch and the server, wherein the SCP retrieves the call management profile from the database via the server.

5. The network of claim 4, wherein the SCP is in communication with the server via a TCP/IP communications link.

6. The network of claim 4, wherein the SCP retrieves the call management profile from the database via the server in response to a TCAP query message from the SSP switch.

7. The network of claim 6, wherein the SSP switch sends the TCAP query message to the SCP in response to an originating trigger.

8. The network of claim 6, wherein the SSP switch sends the TCAP query message to the SCP in response to a terminating trigger.

9. The network of claim 4, wherein the AIN includes an intelligent resource server in communication with the SSP switch and the server for mapping an incoming call to an audio-based interface document generated by the server.

10. The network of claim 9, wherein the intelligent resource server is in communication with the server via a TCP/IP communications link.

11. The network of claim 9, wherein the intelligent resource server includes an audio-based interface interpreter for converting the audio-based interface document to a voice format.

12. The network of claim 11, wherein the server generates a VoiceXML document including the call management profile, and the intelligent resource server includes a VoiceXML interpreter.

13. The network of claim 11, wherein the intelligent resource server includes a DTMF decoder.

14. The communications network of claim 1, wherein the text-based format is a XML document including the call management profile.

15. A method for accessing a call management profile by a user, comprising:

storing the call management profile in a database;

generating an interface document in real time with a server, the interface document containing the call management profile in a text-based format when the user's access mode is a browser and in an audio-based format when the user's access mode is a telephone interface in response to a database access request issued by the user via an AIN structure comprising an element, the AIN structure in communication with the server and for routing the database access request issued by the user to the server;

accessing the document via a TCP/IP communications link; and updating the call management profile directly by the user in the interface document;

wherein the database, the server, and the interface document including the call management profile are located outside of the AIN structure;

wherein the call management profile may be updated by the user directly in the interface document; and wherein the server is further for providing data contained in the call management profile to the AIN element in response to a query therefrom.

16. The method of claim 15, wherein generating the interface document includes generating a VoiceXML document containing the call management profile.

17. The method of claim 16, wherein accessing the document includes routing a telephone call to an intelligent resource server in communication with the server.

18. The method of claim 15, wherein generating the interface document includes generating a HTML document containing the call management profile.

19. The method of claim 18, wherein accessing the document includes accessing the HTML document with a device including browsing software and in communication with the server.

20. The method of claim 15, further comprising modifying the call management profile.

21. The method of claim 20, wherein modifying the call management profile includes writing to the interface document via the TCP/IP communications link.

22. The method of claim 15, wherein the text-based format includes a HTML document.

23. The method of claim 15, wherein the text-based format includes a XML document.

* * * * *